Sept. 9, 1969  O. Y. REECE  3,465,569
LOW TEMPERATURE FLEXURE FATIGUE CRYOSTAT
Filed Oct. 7, 1965
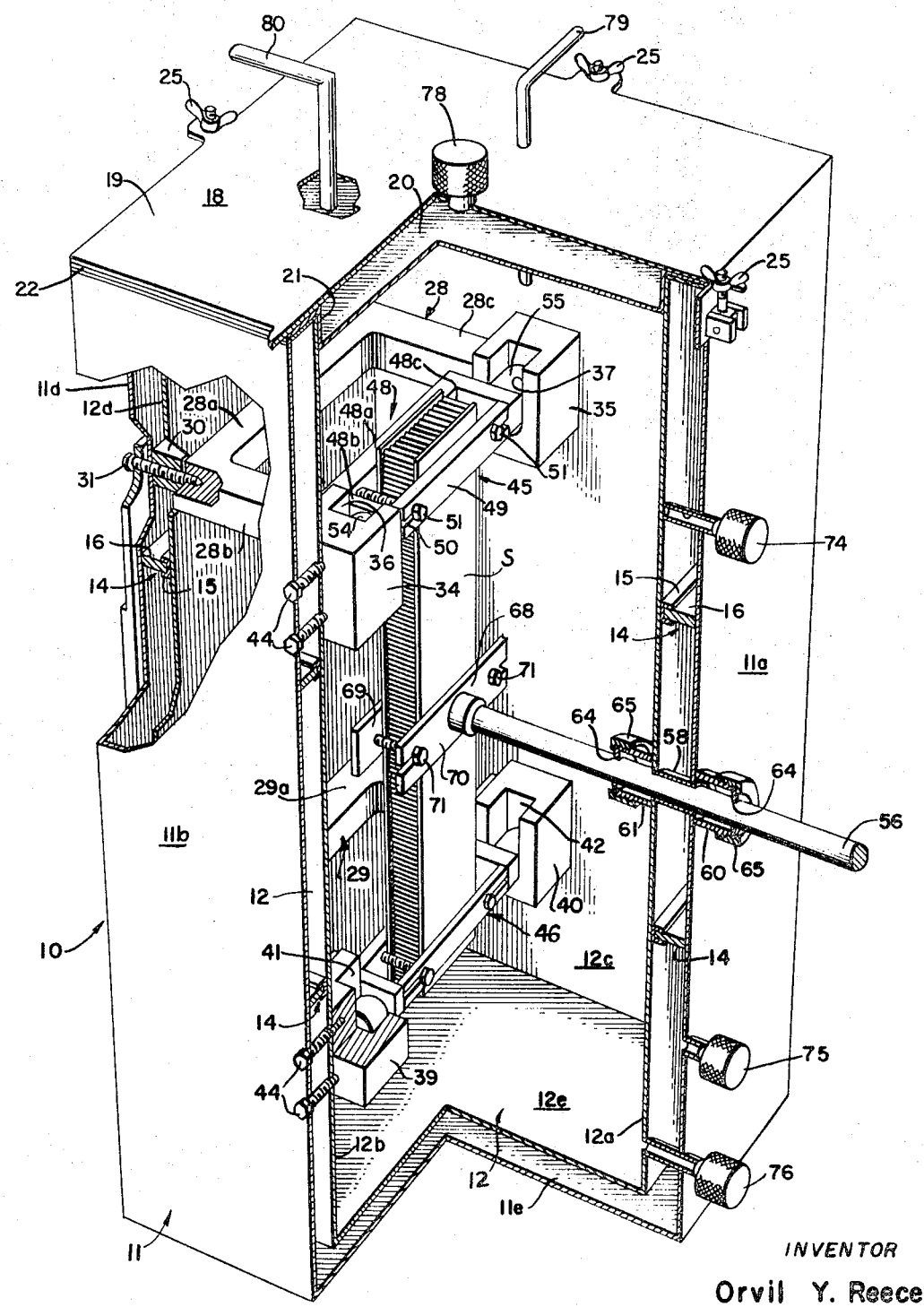
INVENTOR
Orvil Y. Reece
BY
Wayland H. Riggins
ATTORNEYS United States Patent Office 3,465,569
Patented Sept. 9, 1969

3,465,569
LOW TEMPERATURE FLEXURE
FATIGUE CRYOSTAT
Orvil Y. Reece, Huntsville, Ala., assignor to the United
States of America as represented by the Administrator
of the National Aeronautics and Space Administration
Filed Oct. 7, 1965, Ser. No. 493,942
Int. Cl. G01n 25/02
U.S. Cl. 73—15.4                                    1 Claim

ABSTRACT OF THE DISCLOSURE

A flexure fatigue cryostat for testing of materials such as honeycomb panels at cryogenic temperatures. A vertically mounted, top-loading Dewar vessel is provided with upper and lower U-shaped yokes attached to the inner walls of the vessel. The ends of the legs of the yokes have opposed loading slots in which clamps are pivotally mounted. The test specimen is supported vertically at its ends by these clamps in a manner such that lateral movement is prevented, but upward movement and pivoting movement during flexure is allowed. Reciprocating flexure movement is imparted to the specimen intermediate its ends by means of a rod penetrating the front wall of the vessel, the end of the rod being clamped to the specimen.

The invention described herein may be manufactured and used by or for the Government of the United States of America for governmental purposes without the payment of any royalties thereon or therefor.

This invention relates to a cryostat constructed to test various specimens for flexure fatigue at various temperatures, and at especially low temperatures, including temperatures as low as —425° F.

The interest in strength studies of composite honeycomb structures and solids at very low temperatures has increased in recent years. This interest has been stimulated by the advances made in space travel and exploration at the earth's poles. It has become very desirable to accurately determine strength properties of the various composite materials utilized in equipment carried in these low temperatures well in advance of their use so that the probabilities of survival of human life can be calculated.

Accordingly, this invention comprises a flexure fatigue cryostat constructed to provide a means of flexure fatigue testing of various materials at atmospheric and cryogenic temperatures, such as those which will be encountered during pre-launch, launch, and flight conditions of a space craft. The invention comprises a vertically mounted, top loading Dewar vessel having interior load supports at its upper and lower ends and arranged so that a specimen of material to be tested can be pivotally supported at its ends in the load supports and flexed at a point intermediate its ends at various amplitudes and forces and for various lengths of time.

Accordingly, it is an object of this invention to provide a method of flexure fatigue testing of composite honeycomb and solid structures at various temperatures, including cryogenic temperatures.

It is another object of this invention to provide an apparatus for flexure fatigue testing composite honeycomb and solid materials at various temperatures, including cryogenic temperatures.

Another object of this invention is to provide apparatus for mounting various composite and solid materials within a cryostat whereby the materials can be pivotally supported near their ends and motion can be imparted thereto intermediate their ends.

Other objects, features and advantages of the instant invention will be apparent from inspection of the following specification, taken in conjunction with the drawing, in which:

The single figure is a perspective view of the low temperature flexure fatigue cryostat, with parts broken away to show the interior components.

Referring now more particularly to the drawing, reference numeral 10 designates a Dewar vessel having spaced apart stainless steel walls or containers 11 and 12. While a double wall vessel is disclosed, it should be understood that it is within the scope of this invention to utilize a vessel having several walls, the main criterion being that the interior portion of the vessel be insulated from the outer portion of the vessel, as by a vacuum, cryogenic fluid, insulating substance such as polyurethane foam, or any combination of these means. The outer and inner walls comprise, respectively, front portions 11a, 12a, side portions 11b, 12b and 12c, rear portions 11d, 12d and bottom portions 11e and 12e.

The inner and outer walls or containers 11 and 12 are uniformly spaced from each other by the spacers 14 positioned therebetween and spaced along their length. The spacers 14 comprise a U-shaped bracket 15 attached at the base of its U to the inner wall 12. A material of low heat conductivity, such as Teflon, is inserted in the bracket and extends outwardly of the inner wall 12 to contact the inner surface of the outer wall 11. Similar spacers (not shown) are positioned between the bottom portions of the inner and outer walls 12e and 11e, respectively.

The Dewar vessel is closed at its top by a double walled cover 18 of a construction substantially similar to that of the vessel itself. The cover 18 has outer wall 19 and inner wall 20 spaced apart from each other in their central portions, and at their edges the inner wall 20 is folded toward the outer wall 19 at 21 so that the cover exactly fits onto the top of the Dewar vessel 10. A gasket 22 made from an insulating material, such as Teflon, is inserted between the cover 18 and the vessel 10 to insure that the vessel is sealed when the cover is in place, and to inhibit any heat transfer between the vessel 10 and its cover 18. The cover 18 is secured to the vessel 10 by a plurality of securing means 25, of the conventional wing-nut design.

Upper and lower load support yokes 28 and 29, respectively, of substantially identical configuration are positioned near the upper and lower portions of the Dewar vessel. The yoke 28 has a base portion 28a and leg portions 28b and 28c. The lower yoke 29 is similarly shaped with a base 29a and leg portions (not shown). The yokes are dimensioned so that they conform with the interior dimensions with the inner wall 12 in that the bases 28a and 29a extend entirely across the width of the rear wall portion 12b of the inner wall 12 and the legs, such as legs 28b and 28c of the upper yoke 28, extend forwardly from the rear wall portion 12b along the side wall portions 12b and 12c of the inner wall 12, to a point substantially intermediate the front wall portion 12a and the rear wall portion 12b of the inner wall 12.

A load support insert 30, formed of stainless steel or a similar strong metal, is positioned between the outer and inner walls 11 and 12 of the Dewar chamber 10, and extends substantially parallel to the base 28a of the U-shaped yoke 28, between the rear portions 11b and 12b of the outer and inner walls, respectively. The yoke 28, rear portion 12b of the inner wall 12, load support insert 30 and rear portion 11b of the outer wall 11 are all apertured so that a cap-screw 31 can be inserted therethrough to firmly position the yoke 28 against the rear portion 12b of the inner wall 12. With this arrangement it can be seen that the load support insert 30 helps to maintain the outer and inner walls 11 and 12 in their predetermined spaced relationship while it allows the cap-screw 31 to be securely threaded into the yoke 28 so that it is tightly pressed against the rear portion 12b of the inner wall 12. The lower yoke 29 is attached to the inner wall 12 in a similar manner.

The upper yoke 28 has brackets 34 and 35 positioned and welded to the ends of the legs 28b and 28c remote from the base 28a of the U-shaped bracket 28. The brackets 34 and 35 each have center facing slots 36 and 37 that are diametrically opposed and adapted to be vertical loading slots. The lower yoke 29 has similar brackets 39 and 40, each having diametrically opposed vertical loading slots 41 and 42, similar to those of the upper yoke 28. The brackets 34 and 35 of the upper yoke 28, and the brackets 39 and 40 of the lower yoke 29, are secured to the side walls of the Dewar vessel 10, such as side walls 11b and 12b, by the screws 44.

End clamps 45 and 46 of the offset bracket type are positioned in the diametrically opposed vertical loading slots of the upper and lower yokes, respectively. The end clamp 45 comprises a bracket 48 of a substantially U-shaped configuration having a base portion 48a and leg portions 48b and 48c. A cover 49, having slots 50 at its ends, is adapted to be secured to the base 48a of the clamp 48 by the cap screws 51.

The legs 48b and 48c of the U-shaped bracket 48 have diametrically opposed needle bearings 54 and 55 arranged to extend into the vertical loading slots 36 and 37 so that the end clamp 45 is pivotal along the axis of its needle bearings 54 and 55, in the loading slots 36 and 37.

The lower end clamp 46 is identical in construction with the upper end clamp 45 and is constructed to be pivotally supported by the vertical loading slots 41 and 42 of the lower yoke 29.

The front wall portions 11a and 12a of the outer and inner walls 11 and 12, respectively, are apertured at their center portions so that a load rod 56, constructed of a material such as titanium, can extend therethrough. In order to insulate the inner portion of the Dewar vessel from the atmosphere, a sleeve 58 is positioned and welded between the front portions 11a and 12a of the outer and inner walls 11 and 12, respectively, around the load rod 56 to prevent the vacuum existing in the space between the outer and inner walls from being lost through the apertures. Furthermore, the flanges 60 and 61 are connected to the outer and inner walls, respectively, the flange 60 extending outwardly from the outer wall and the flange 61 extending inward from the inner wall. The flanges 60 and 61 are externally threaded, and washers 64 of an insulating substance such as Teflon are positioned outwardly of each, and the caps 65 are threaded thereon to compress the washers against the flanges. The washers 64 are dimensioned to slideably but tightly fit around the load rod 56 so that the load rod can be reciprocated through the front wall portions 11a and 12a of the outer and inner walls 11 and 12 with a minimum of heat transfer between the atmosphere and the inner portion of the Dewar vessel 10.

The load rod 56 has a clamp 68 attached to its end projecting inside the Dewar vessel. The clamp 68 has parallel plates 69 and 70 fastened to each other by the bolts 71.

The Dewar vessel 10 has a bonnet valve 74 that is capable of communicating the area intermediate its outer and inner walls 11 and 12 with the atmosphere or with a vacuum pump for evacuating the air from between the walls 11 and 12. The vessel also has the conventional rupture disc 75 and a drain 76 at its lower portion. The cover 18 has a bonnet valve 78 for exerting a vacuum in its intermediate portion between its walls 19 and 20. The cover 18 also has a thermocouple 79 and a cryogen inlet 80 extending therethrough.

OPERATION

In operation of the low temperature flexure fatigue cryostat a sample of composite honeycomb material, such as the sample S shown in the drawing, is clamped at its ends by the clamps 45 and 46 and positioned inside the Dewar vessel 10; the clamps 45 and 46 being mounted in the diametrically opposed vertical loading slots of the upper and lower yokes 28 and 29. The composite honeycomb material S is also clamped in the clamp 68 and the cover 18 is fitted over the vessel 10 and secured thereon by means of the clamping means 25. A cryogenic fluid is admitted through the cryogen inlet 79 until the interior portion of the vessel is brought to the desired temperature, as determined by the thermocouple. When the vessel is at the proper temperature for a predetermined period of time so that the composite honeycomb substance S has attained the temperature desired for its test, the load rod 56 is reciprocated through the front wall portions 11a and 12a of the outer and inner walls 11 and 12.

The reciprocal movement of the load rod 56 is carefully calculated in amplitude and force exerted and number of reciprocations in order to determine accurately the strength of the material being tested inside the Dewar vessel.

It can be seen that vertical loading slots 36–37 and 41–42 of the upper and lower yokes 28 and 29 support the material being tested so that substantially no lateral movement is encountered at the ends of the material while the center portion of the material is free to be moved by the load rod 56. Also, since the end clamps 45 and 46 are pivotally mounted, substantially no shearing force will be encountered at the ends of the material since the ends of the material will be allowed to pivot along the axis of the needle bearings in their loading shots.

In the event that the length of the tested material changes during the fatigue testing of the material or when the material is initially cooled by the cryogenic fluid, the fact that the slots of the upper and lower yokes are open allows the material to be lengthened or shortened without restriction from the loading slots.

Thus, the resistance offered the loading rod is restricted to the bending or flexing resistance of the tested material plus any resistance from the sliding action of the load rod through the washers 64 of the flanges 60 and 61, which is easily precalculated. Accordingly, a very accurate determination of the tested material's resistance can be made at selected temperatures.

It will be obvious to those skilled in the art that many variations may be made in the embodiments chosen for the purpose of illustrating the present invention without departing from the scope thereof as defined by the appended claim.

I claim:

1. A low temperature cryostat of the type utilized to test the strength of materials at temperatures varying from atmospheric temperatures to extremely low temperatures, comprising in combination:
   (a) a Dewar vessel open at one end and including an inner container and an outer container each having a front wall portion, side wall portions, a rear wall portion and a bottom wall portion;
   (b) a cover for tightly closing said Dewar vessel;
   (c) means for injecting cryogenic fluid into said Dewar vessel;
   (d) means for supporting within said Dewar vessel a material to be tested, said means including;
      (1) a pair of load inserts spaced from each other along the length and between said rear wall portions of said inner and outer containers,
      (2) a pair of U-shaped yokes disposed in parallel relationship and having the base of their U attached to the rear wall portions and said load supports of said containers and the legs of their U attached to the side wall portion of said containers, (a) said U-shaped yokes having in their legs at their ends remote from their base opposed loading slots,
(3) an end clamp pivotally mounted in said opposed loading slots of each said yoke and arranged to support a material to be tested at its ends in said opposed loading slots,
(e) a load rod reciprocally extending through the front wall portions of said inner and outer containers of said vessel;
(f) a clamp attached to the end of said load rod inside said vessel arranged to be clamped to the material to be tested at a portion thereof between said end clamps; and
(g) means for reciprocating said load rod.

References Cited

UNITED STATES PATENTS

| | | | |
|---|---|---|---|
| 1,409,842 | 3/1922 | Foster | 73—91 |
| 2,404,584 | 7/1946 | Liska | 73—15.6 |
| 2,495,746 | 1/1950 | Lubin | 73—15.4 |
| 2,825,223 | 3/1958 | Conti | 73—91 |
| 3,058,224 | 10/1962 | Goodemote | 33—169 |
| 3,324,714 | 6/1967 | Simon et al. | 73—100 |
| 2,469,346 | 5/1949 | Watter | 73—100 |

RICHARD C. QUEISSER, Primary Examiner
R. S. SALZMAN, Assistant Examiner